Aug. 21, 1956

O. H. SCHADE 2,760,109

KINESCOPE DEFLECTION CIRCUITS

Filed Dec. 26, 1952

INVENTOR.
Otto H. Schade
BY
ATTORNEY

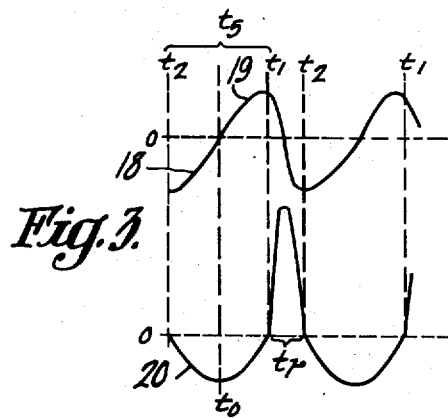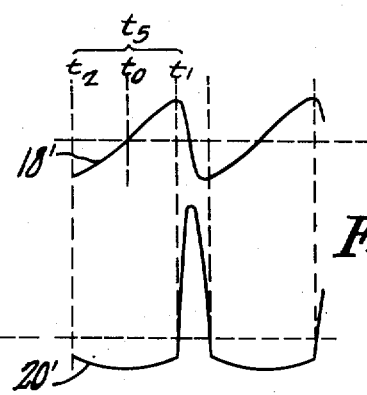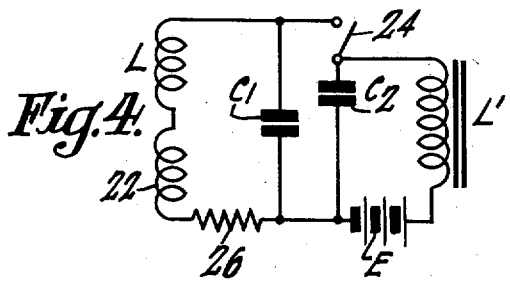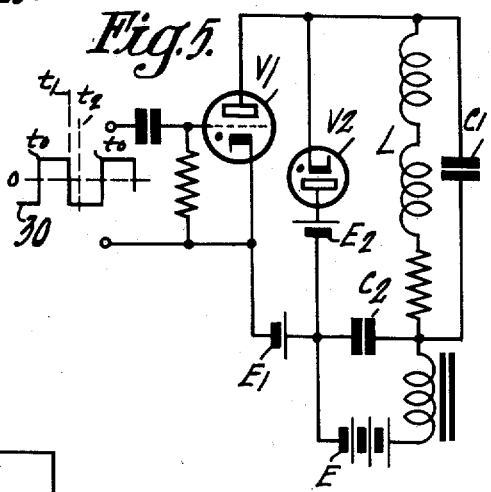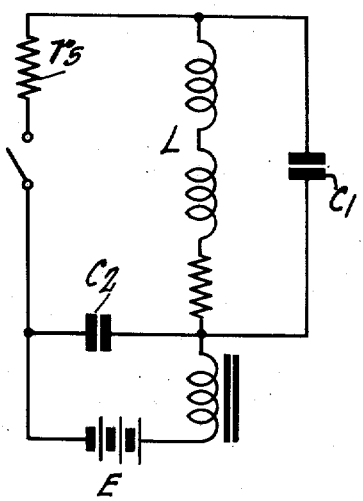

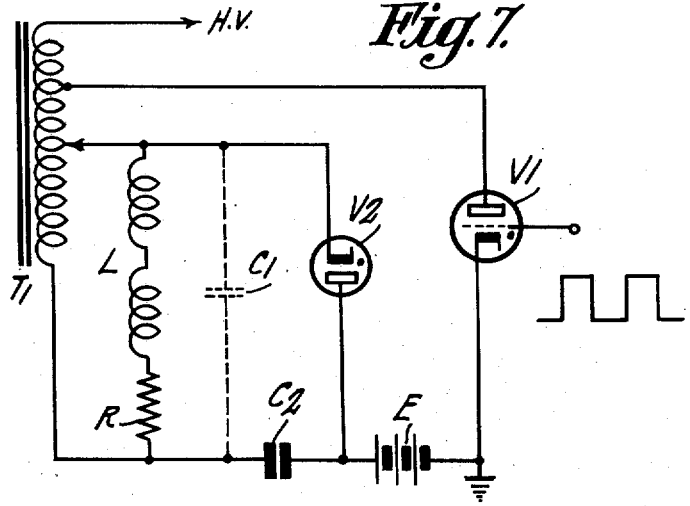
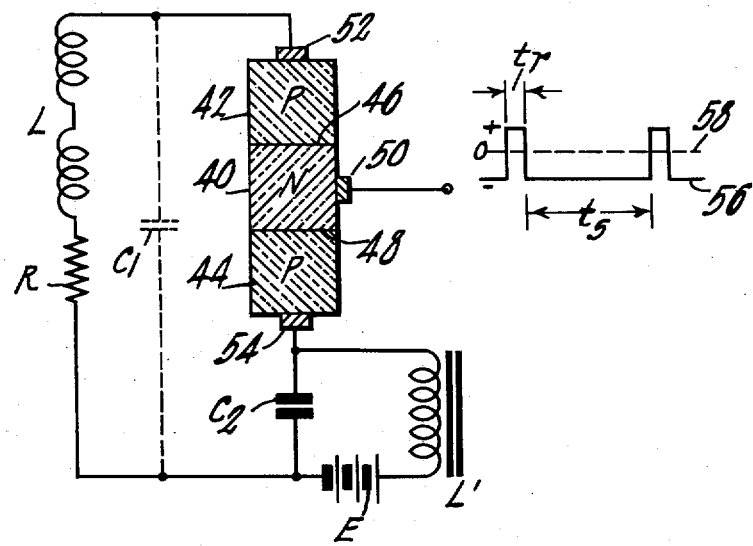

United States Patent Office 2,760,109
Patented Aug. 21, 1956

2,760,109

KINESCOPE DEFLECTION CIRCUITS

Otto H. Schade, West Caldwell, N. J., assignor to Radio Corporation of America, a corporation of Delaware Application December 26, 1952, Serial No. 328,000

10 Claims. (Cl. 315—26)

The present invention relates to new and useful deflection circuits suitable for use in connection with the deflection of the scanning beam of a cathode ray tube or "kinescope."

More specifically, this invention relates to a circuit for producing a deflection current in an electromagnetic deflection coil, for example, which is adapted to cause uniform travel of an electron beam across the face of a kinescope, despite the fact of a wide angle through which such beam may be deflected.

In the early stages of development of systems for electromagnetically deflecting a cathode ray beam, the usual goal has been the production of a sawtooth current waveform through the coils in order to produce "linear deflection" of the beam. With the more recent use of kinescopes having a larger screen area for the same length of kinescope, the problem of "linearity" in scanning has become even greater, since the beam must be deflected through a much greater angle.

It is, therefore, a primary object of the present invention to provide means for producing a deflection current in electromagnetic coils, which current is adapted to cause linear travel of a cathode ray beam projection through a wide deflection angle.

Another and more specific object is the provision of means for producing such a current, which means takes into account the fact that the angle of deflection is not a linear function of the distance traversed by the beam across the tube face.

Still another object of the invention is to provide means for efficiently producing a deflection current which varies in accordance with the desired rate of increase of the angle of deflection, measured from the central position of the ray to its outermost extremity.

In general, this invention is predicated on the facts that the current in the deflection coil is proportional to the sine of the deflection angle and that the distance traversed by the beam tip will vary non-linearly with respect to the angle of deflection, while it is desirable that the projection of the distance onto a plane perpendicular to the tube axis, i. e. the tangent of the deflection angle, should vary linearly with respect to time. To obtain a highly efficient deflection system, the present invention employs a tuned resonant circuit of such frequency that a portion of the sine wave is directly used as the deflection current. By switching from one frequency to a higher frequency, the "retrace" portion of the deflection current may constitute a section of another sine wave of that higher frequency.

Hence, it is another object of this invention to provide a resonant circuit which may include the inductance of the deflection coils themselves together with a capacitor for producing a sinusoidal current which has a predetermined frequency such that its period generally coincides with the scanning time of the cathode ray beam.

Another object is the provision of means for switching from a resonant circuit of a given frequency to one having a higher frequency in order to produce a sinusoidal current wave of the higher frequency so that a section thereof is adapted for use in returning the beam during retrace time.

In order that the present invention may be of substantially universal value, it is a further object to provide means for producing the above-described sinusoidal deflection current which is adapted for use with various maximum deflection angles.

While the basic principle of the present invention may be described as including a switch for shifting rapidly from one to another of the tuned circuits, there are problems in practice of supplying the power loss to a practical resonant circuit. Thus, it is a further object to provide means for compensating for the power loss in the electronic switches.

Other objects and advantages will become apparent from a study of the following detailed description of the accompanying drawings in which:

Figs. 3 and 3(a) illustrate certain current and voltage waveforms to be referred to in the description of the invention;

Fig. 4 is a schematic diagram of a basic, theoretical circuit having the fundamentals of the invention;

Fig. 5 is a schematic diagram of a circuit according to the present invention;

Fig. 6 illustrates the equivalent circuit of that of Fig. 5;

Fig. 7 illustrates a modified form of the circuit of Fig. 5; and

Fig. 8 shows another embodiment of the present invention, by way of circuit diagram.

GRAPHICAL ANALYSIS

Figure 1:
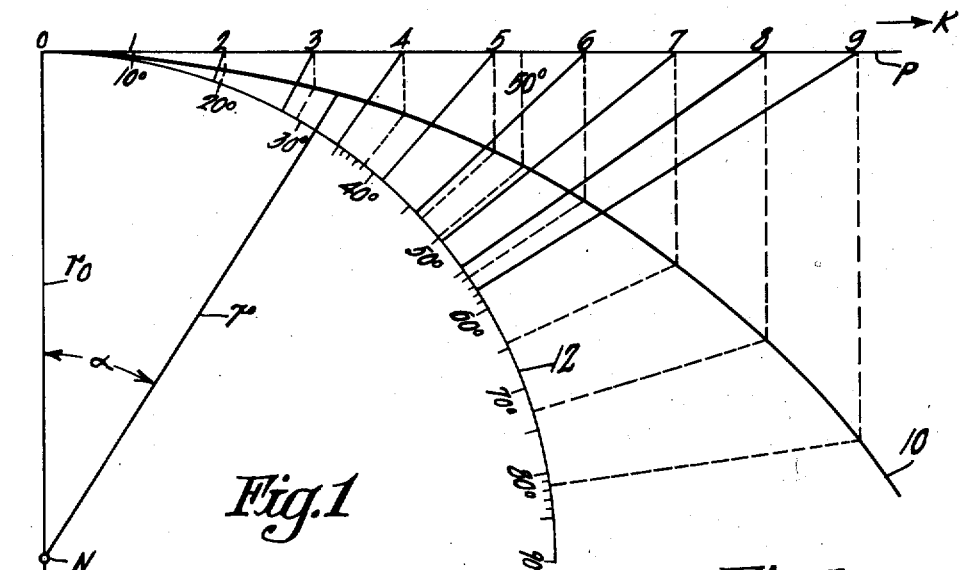
Fig. 1 is a graphical construction illustrating the deflection of an electron beam.

In the construction of Fig. 1, reference numeral 10 indicates, solely by way of illustration, a portion of a curved kinescope screen having its center of curvature at M. The theoretical center of deflection of a cathode ray beam (not shown) is assumed to be at point N, so that the radius of curvature of the screen 10 is twice that of the deflection arc at the central point on the screen (i. e. where the deflection angle $\alpha$ is equal to zero). The straight line P is drawn tangent to the tube screen 10 at its center and is divided into equal increments K of its length. As those skilled in the art will appreciate, the line P may be considered as indicating the locus of scanning points on a substantially flat tube face, in contradistinction to the curved screen. Lines perpendicular to the tangent line P are drawn from the incremental division markings "1, 2, 3 . . ." to the curved screen 10 and the points of intersection of these lines (shown dotted) are joined to the center of deflection N. For purposes of simplifying the drawing, these latter lines are not continued beyond the angular scale 12 which denotes the angular deflection $\alpha$ of the tube's electron beam.

It is, therefore, seen that the dotted lines extending from the points of intersection to the scale indicate the deflection angle $\alpha$ which is necessary to produce a "projection" of the electron beam spot at the K points on the tangent line. The "projections" onto the tangent are, of course, substantially what are seen by an observer at the usual distance from the screen.

The solid lines, on the other hand, which join the K points to the center of deflection N, illustrate the deflection angle $\alpha$ which is required for uniform velocity of deflection with a substantially planar tube face.

From the above construction, the following tabulation of values may be made:

*Table 1*

| Flat Face | | | Curved Face (Radius=2×Radius of Deflection) | |
|---|---|---|---|---|
| Sin α | α Degrees | K | α Degrees | Sin α |
| 0.174 | 10 | 1 | 10 | 0.1736 |
| 0.326 | 19 | 2 | 20 | 0.342 |
| 0.462 | 27.5 | 3 | 29 | 0.485 |
| 0.574 | 35 | 4 | 38.5 | 0.623 |
| 0.663 | 41.5 | 5 | 47.5 | 0.737 |
| 0.725 | 46.5 | 6 | 56.2 | 0.831 |
| 0.777 | 51 | 7 | 64.5 | 0.903 |
| 0.81 | 54 | 8 | 73 | 0.956 |
| 0.844 | 57.6 | 9 | 81.5 | 0.99 |
|  |  | 9.5 | 86.5 | 1 (approx.) |

The table clearly indicates that the deflection angle α does not increase linearly with respect to the deflection distance. The tables further list the values of sin α which are proportional to the deflection current required for obtaining the specified angle α.

Figure 2:
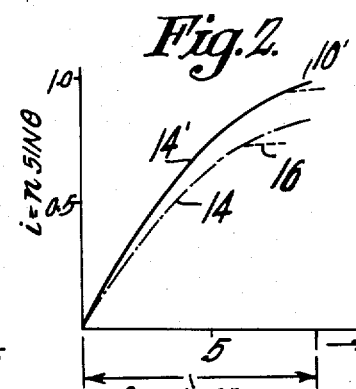
Fig. 2 is a plot of certain of the data derived from Fig. 1.

In accordance with the illustrative example set forth above for a flat-faced tube, Fig. 2 is a graph in which the current in a deflection coil is plotted along the ordinate axis, while the integers K are along the abscissa. From the graph of Fig. 2, the values for which are taken from the above table, it is apparent that for a deflection angle equal to approximately 50° (i. e. $K=7$) in the case of a "flat-faced" tube, the current wave 14 (dot-dash curve) constitutes substantially a section of a sine wave from zero to 90° or $\pi/2$, a minor deviation therefrom being indicated by the dotted line at 16, the reason for this deviation will appear more fully hereinafter. In any event, it is seen that the current may be treated as a section of a sine wave up to a deflection angle of 50° (that is, a "cone angle" of $2\alpha$ which is equal to 100°). The corresponding inductive voltage in a high "Q" circuit will therefore be a section of a sine wave which is 90° out of phase.

The solid line 14' of Fig. 2 represents a similar plot for the curved tube face employed above by way of example and illustrates that the sine values are larger than in the preceding case of a flat face. Thus, curve 14' follows a sine-wave contour which reaches its 90° point where K is 9. As shown in Fig. 1, if in this case the deflection angle α is 50° (i. e. "cone angle," $2\alpha$ is equal to 100°), a deflection of $K=5.3$ is required. In other words, as is apparent from Fig. 2, a portion of the sine curve 14' of $\theta=53°$ corresponding to $K=5.3$ on each side of the zero axis would provide a substantially perfect match since it does not reach that portion of the curve indicated at 16' where the curve deviates from a true sine wave.

Up to this point, it has been shown graphically that for the velocity of scanning to be substantially constant or "linear," it is necessary for the deflection current in the coils to be nonlinear in wave shape. More specifically, it has been seen from Fig. 2 that the deflection current must be sinusoidal for properly constant-velocity deflection to be had. The graphical analysis has also pointed out the fact that, where the deflection angle is such that it is necessary to use a complete half cycle of a sinusoidal current wave, there exists a deviation from the time sine wave shape of the relationship between deflection angle change beam tip travel. While this deviation occurs only at the extremities of deflection and has, therefore, a less noticeable effect on linearity of scansion, the reason for its presence will become apparent from the mathematical analysis which follows. Furthermore, although this factor might otherwise seem to be a minor shortcoming in the application of the invention, it will be shown that its correction actually affords certain advantages in kinescope design.

MATHEMATICAL ANALYSIS

The question of selecting the proper section of a sine wave for the deflection current depends upon a plurality of factors such as the contour of the kinescope screen, the maximum deflection distance observed as a projected distance of the electron beam tip, and the radius of deflection. This problem, however, may be resolved mathematically in the following manner:

It is desired that the coordinate length K along the P axis of Fig. 1 from the tube center to the beam tip be proportional to time and to the phase angle $\theta$ of the sinusoidal current 14 or 14' of Fig. 2. Thus, it may be expressed in equation form $$K = J\theta \quad (1)$$

where $$J = K_{Max}/\theta_{Max}$$

From Fig. 1, it is seen that $$\sin \alpha = \frac{K}{r} \quad (2)$$

where $r$ is the distance from the center of deflection to the tube screen for any given deflected position of the electron beam.

substituting (1) in (2)

$$\sin \alpha = \frac{J\theta}{r} \quad (3)$$

It is desired, as shown in Fig. 2, that $$i = n \sin \theta \quad (4)$$

where $n$ is a constant.

It is also well known that the deflection current $i$ is proportional to the sine of the deflection angle α, as stated by $$i = m \sin \alpha \quad (5)$$

where $m$ is another constant.

Equating (5) and (4), $$\sin \alpha = \frac{n}{m} \sin \theta \quad (6)$$

And with Equation 3

$$\frac{n}{m} \sin \theta = \frac{J\theta}{r} \quad (7)$$

Solving for "$r$":

$$r = \frac{m}{n} J \frac{\theta}{\sin \theta} \quad (8)$$

If the deflection angle α is allowed to approach zero, the ratio $\theta/\sin \theta$ approaches unity, thus defining the value $$r_0 = \frac{m}{n} J \text{ at } \alpha = 0 \quad (9)$$

where "$r_0$" is the distance from the center of deflection to the tube face at its central position.

Hence, the following expressions may be obtained:

$$\left. \begin{array}{l} r/r_0 = \theta/\sin \theta \\ \text{and, restating (1), } K/K_{Max} = \theta/\theta_{Max} \end{array} \right\} \quad (10)$$

It should be noted at this point that Equations 10 define the exact shape of the contour curve of the kinescope face for which the beam tip's projection distance "K" will increase linearly with time when the deflection current is sinusoidal.

The kinescope face contour curve computed with Equations 10 may be tabulated as follows where $$\theta_{Max} = \frac{\pi}{2}$$

Table 2

| θ (Radians) | θ° | Sin θ | r/r₀ | K/K_max |
|---|---|---|---|---|
| π/2=1.5708 | 90 | 1.0000 | 1.5708 | 1.000 |
| 1.3963 | 80 | 0.9848 | 1.42 | 0.889 |
| 1.2217 | 70 | 0.9397 | 1.30 | 0.778 |
| 1.0472 | 60 | 0.8660 | 1.21 | 0.667 |
| 0.8727 | 50 | 0.7660 | 1.14 | 0.555 |
| 0.6981 | 40 | 0.6428 | 1.085 | 0.444 |
| 0.5236 | 30 | 0.5000 | 1.047 | 0.333 |
| 0.3491 | 20 | 0.3420 | 1.02 | 0.222 |
| 0.1745 | 10 | 0.1736 | 1.005 | 0.111 |
| 0 | 0 | 0 | 1.000 | 0.000 |

Figure 2A:
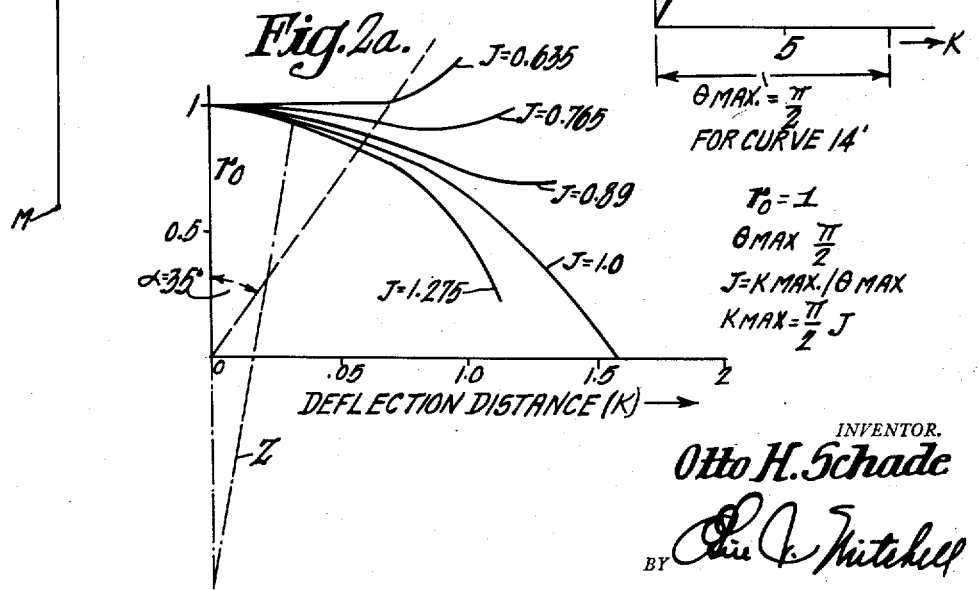
Fig. 2(a) is another graphical construction to be described.

Fig. 2(a) is a plot of the contour curve for $$\theta_{max} = \frac{\tau}{2}$$

wherein "$r_0$" is assumed to be unity and different values are assumed for the maximum distance $K_{max} = J\theta_{max}$ (or 1.5708 J) by varying J, which specifies the deflection distance (relative to "$r_0$") at which the sinusoidal deflection current is to have the value $$\theta_{max} = \frac{\pi}{2}$$

As can be seen, therefore, Fig. 2(a) illustrates some of the infinite number of contour curves for which the beam tip distance K increases linearly when the deflection current is accurately sinusoidal. The end point of the curves depends on the parameter J and is real for the entire curve when J is equal to or less than unity. For curves where J is greater than unity, such as that labeled "$J=1.275$," only a portion of the curve is real, since "$r$" is shorter than the distance "K" beyond certain values of θ.

From the foregoing, it may be seen that, by selecting a maximum value for θ (i. e. the maximum section of a sine wave deflection current to be employed) and a maximum distance "K" to be traversed by the deflected beam's projection, the contour curve for optimum operation at that parameter "J" may be drawn, using Equations 10 and Table 2. The actual steps to be taken in plotting the contour are as follows:

(1) Lay out value "$r_0$" (as unity for the sake of simplicity) on the ordinate scale.
(2) Lay out "$K_{max}$" on abscissa scale.
(3) Select various intermediate values of "K" and draw a line parallel to "$r_0$" for each of such intermediate "K" values.
(4) For each intermediate "K," find the value $K/K_{max}$ by division and locate this value in Table 2. Find the corresponding value of $r/r_0$ and draw a circle from the center of deflection having that radius $r/r_0$; the intersection of that circle with the corresponding parallel "K" line is a point on the contour curve.

Having thus drawn an optimum curve for the desired values, "$K_{max}$" and $\theta_{max}$, the deflection angle α may be computed from Equation 2 and it is apparent from Fig. 2(a) that linearity of deflection may be obtained at a given angle α (for example, 35°) with an infinite number of differently shaped tube screens and correspondingly different sections θ of the sinusoidal deflection current.

The sine wave section θ follows from Equation 1 and, for α=35°, has the following values for the various curvatures denoted by the several "J" values:

Table 3

| $J=\frac{K_{max}}{\theta_{max}}$ | K (from Fig. 2 (a)) | θ (radians) | θ° |
|---|---|---|---|
| 1.275 | 0.59 | 0.462 | 26.5 |
| 1.0 | 0.61 | 0.61 | 35. |
| 0.89 | 0.62 | 0.696 | 39.9 |
| 0.765 | 0.65 | 0.85 | 48.7 |
| 0.635 | 0.71 | 1.12 | 64.2 |

Hence, it follows, and may be seen by inspection of Fig. 2(a), that a given tube screen contour may be closely approximated by one of the precisely drawn curves. For example, a flat-faced tube may be approximated by the curve $J=0.635$, which requires a sinusoidal current section θ up to 64.2° (as computed from Equation 1 supra). Also, by way of illustration, a curved face with radius "Z" may be closely matched by the curve $J=0.89$, for which Table 3 shows $\theta=39.9°$ at a deflection angle α of 35°. In other words, variations of the sine wave section θ will give one optimum condition matching a given tube contour with the least error for a given cone angle.

Using the opposite approach, it should now be readily apparent that a kinescope screen contour may be designed with a definite "$K_{max}$" and $\theta_{max}$ in mind in order to obtain even theoretically perfect, linear scansion. From the several "J" curves of Fig. 2(a), it will be noted that certain contours (e. g. $J=0.765$) have a reversal of curvature. This, as may be deduced from a statement made above, is related to the fact that the curve 14 of Fig. 2 deviates at 16 from the true sine wave. More specifically, it should be appreciated that the finite slope of the sine wave as it approaches its maximum does not quite provide the necessary slow rate necessary for perfectly uniform scanning velocity. The portion with reversed curvature, however, accommodates this fact and, therefore, permits use of the entire half-cycle of a sinusoidal current wave with perfectly linear deflection. In the design of tubes and even in the case of curved screens, moreover, it is often necessary to employ a somewhat flattened peripheral portion, as for purposes of effecting a proper glass to metal seal or other reasons. As shown, the flattened peripheral face portion with a large or reversed radius of curvature may now be designed carefully with deflection in mind, so that a complete half-cycle of a sine wave current will produce substantially perfect deflection over the entire tube face.

CIRCUIT DESCRIPTION

For purposes of explaining the circuitry disclosed herein as suitable for practicing the present invention, the various examples, employed below in the description, are given with reference to a substantially flat-face kinescope. This, however, is done only in the interest of simplicity and it should, therefore, be borne in mind that the same circuitry may be employed in conjunction with kinescopes of any screen contour, as explained supra.

The present invention may be most clearly illustrated in its most basic form as the idealized schematic circuit of Fig. 4. Reference numeral 22 refers to the inductance of the deflection coils in parallel with a capacitor $C_1$. A switch 24 is adapted to connect into this circuit another capacitor $C_2$ which is in series with a source of voltage E and a very large inductance L'. Persons skilled in the art will appreciate the fact that the inductance "L" of the coil 22 and capacitance $C_1$ form a resonant circuit having a frequency $f$ equal to the reciprocal of $2\pi\sqrt{LC}$. The switching of capacitor $C_2$ into the first resonant circuit will result in a new resonant circuit of a lower frequency. In the ideal form, the resonant circuits have a high "Q" since the value of the resistance 26 of the coil 22 is extremely small in comparison to $2\pi fL$.

Fig. 3 illustrates a current wave, indicated generally by reference character 18, consisting of sinusoidal sections in accordance with the above explanation, while the corresponding inductive voltage waveform is indicated at 20. The current waveform 18 of Fig. 3, according to the present invention comprises, for the scanning time $t_s$, one-half of a sine wave produced by the resonant circuit which includes the inductance L and capacitors $C_1$ and $C_2$. Similarly, that portion of the current waveform 18 which occurs during the retrace time $t_r$ (i. e. from time $t_1$ to $t_2$) is a half cycle of a sine wave having a frequency determined by the inductance L in circuit with capacitor $C_1$. Of course, the current waveform 18 of Fig. 3 is shown for a situation in which the "cone angle" (2a) of a substantially flat-faced tube is approximately equal to 100° for, as shown by the above table, it is that deflection angle which requires substantially a one-half cycle of a true sinusoidal wave. In this case, the retrace time will be equal to the reciprocal of twice the high frequency resonant circuit which includes the inductance and capacitance $C_1$ and may be expressed mathematically as follows:

$$t_r = \pi\sqrt{LC_1} \qquad (11)$$

Similarly, the mathematical expression for the value of the scanning time is the following:

$$t_s = \pi\sqrt{L(C_1+C_2)} \qquad (12)$$

In the operation of the circuit of Fig. 4, the voltage source E charges the capacitor $C_2$ very slowly through the large inductance of choke L' to the voltage of the source. At the moment $t_0$ that the switch 24 is closed the first time, the circuit which includes the inductance L of coil 22 and the sum of capacitors $C_1$ and $C_2$ commences oscillation with the current rising as at 19 and the voltage 20 reaching zero at time $t_1$. At this point $(t_1)$, the switch 24 is opened and the capacitor $C_2$ is removed effectively from the circuit, thus leaving only capacitor $C_1$ in parallel with the coil 22, with the result that the frequency of the resonant circuit is increased to the value determined by the inductance and capacitance of coil 22 and capacitor $C_1$, respectively. As shown, the current 18 reverses its direction, thus charging and discharging the capacitor $C_1$ in a half cycle of a sine wave. During this time (i. e. between $t_1$ and $t_2$) the voltage 20 will reach its high positive peak which may be expressed by the following mathematical relationship: $\hat{e} = (t_s/t_r)\hat{E}$, where $\hat{E}$ is the voltage to which $C_1$ and $C_2$ are charged at the time $t_0$.

When the voltage 20 returns to zero and the current 18 is at its negative peak value, these events being indicated along the vertical dotted line $t_2$, the switch 24 is again closed to add capacitor $C_2$ to the circuit, which results in reverting to the original lower frequency sine wave indicated between time $t_2$ and $t_1$ which is, of course, the slower deflection required during actual scansion of the tube face 10.

Persons skilled in the art will recognize the fact that the amplitude of the current 18 may be controlled by varying the value of the voltage source E so that in the ideal case wherein the resistance 26 is equal to zero, the direct current from the battery E will decrease to zero after the initial charging of the capacitors, permitting disconnection of the battery and L'.

In order to render the invention as thus far described more readily apparent, an example with numerical values may be employed. If it be assumed, therefore, that scanning time $t_s$ is 56 micro seconds while the retrace time $t_r$ is 7.5 micro seconds and that the inductance of the coil L is equal to 12.5 millihenries, the current 18 of Fig. 3 will be substantially a half cycle of a sine wave for a tube of a certain contour where the deflection distance "K" requires it. By substituting these values in Equations 11 and 12 above, it is found that the high frequency sine wave employed during retrace has a frequency of 66.6 kilocycles and that $C_1$ has a capacitance of 455 micro-micro-farads. It is also found that the low frequency sine wave, a portion of which is employed during scanning time, has a frequency of 8.95 kilocycles and that the sum of $C_1$ and $C_2$ is equal to 0.0252 microfarad.

This portion of the invention has been described with respect to a maximum deflection angle requiring a full half cycle of a sinusoidal current wave. Where, however, it is necessary to use a shorter section $\theta$ of the sine wave, as indicated, for example, by Table 3, Fig. 3(a) illustrates at 18' a current waveform such as might be employed and which is similar to that of 18 in Fig. 3, with the exception that, in the case of Fig. 3(a) a section $\theta$ smaller than $$\frac{\pi}{2}$$

is used. It is seen, therefore, that, if the scanning time $t_s$ in this case is to be the same as that in the preceding example, a sine wave of lower frequency must be employed during scanning time. Stated otherwise, this would be equivalent to delaying time $t_2$ and hastening time $t_1$ a corresponding amount with respect to the half cycle sine wave 18. The desirability of having equal scanning times regardless of the deflection angle of a given kinescope is obvious and, for that reason, the expedient of changing the switching times is not resorted to but, instead, the frequency of the sinusoidal current waveform between $t_2$ and $t_1$ is lowered by suitable changing of the capacitor values and a slightly higher retrace frequency is used.

The reason for employing a higher frequency sine wave during retrace in this case is that it is theoretically necessary to use more than one-half of a sinusoidal cycle. This is brought about by the fact that, at time $t_1$, the slope of the current waveform 18' is a finite value (i. e. greater than zero). Since the inductance will not permit the current to change its direction instantaneously from a positive slope to a zero slope, a rising portion of the high frequency retrace wave is "grafted" onto the rising low frequency wave and thus carries the deflection current through its peak magnitude (i. e. zero slope) in a gradual manner permitted by the inductance similar conditions exist and apply at the time $t_2$. It might be noted that, if the retrace curve were not changed as above-indicated, the circuit, in practice, would provide transient waves to carry the current through its change in slope. The transients, however, lengthen the retrace time and may produce undesired effects in the appearance of the raster and, therefore, the change in retrace wave is preferred.

It has thus been shown that the basic circuit of Fig. 4 is useful in providing high efficiency for substantially all deflection angles such that the travel of the electron beam across the kinescope face 10 will appear linear in its projection as seen by a viewer, assuming that high "Q" values for the two resonant circuits are maintained. The circuit of Fig. 4 is intended to serve merely as a theoretical basis for the exposition of the principles of the present invention.

Fig. 5 illustrates schematically a circuit corresponding to that of Fig. 4 wherein the switch 24 is replaced by two vacuum tubes or gas tubes $V_1$ and $V_2$ which are connected in parallel and in opposition. Fig. 6 depicts the equivalent of the circuit of Fig. 5. In order to provide for "switching" of the tubes $V_1$ and $V_2$ which, as has been stated, may be gaseous tubes, the square wave 30 is impressed across the input terminals thereof so that the gas triode $V_1$ will conduct from time $t_0$ to $t_1$ (Fig. 3), since that tube is fired by the leading edge of the square wave 30 at $t_0$, while being extinguished at $t_1$. As shown by the voltage waveform 20 of Fig. 3, the voltage rises rapidly from a zero value at time $t_1$ (i. e. the beginning of retrace) to a high positive value, thus requiring an extremely short deionization time. At the end of the retrace time, the gas triode $V_2$ conducts automatically by virtue of its plate voltage having become positive, thereby carrying the current from its negative peak value to zero at time $t_0$ where $V_1$ again takes over in conducting the current. The cathode of triode $V_1$ is connected to the negative terminal of a battery $E_1$ while the plate of diode $V_2$ is connected to voltage source $E_2$. The value of battery $E_1$ will cancel, as persons skilled in the art will understand, the effect of the constant voltage drop required for ion conduction in the gas tube $V_1$ and, similarly, the same effect is wrought by battery $E_2$ in connection with diode $V_2$. The battery E may be varied to produce a change in the time at which conduction of the diode $V_2$ commences, as may be required by different values of the sine wave section $\theta$. Where $\theta$ is much less than $$\frac{\pi}{2}$$

the voltage E is adjusted in order that proper switching may be had. The internal resistance of the tubes is indicated in Fig. 6 as "$r_s$" and may be of the order of one to two ohms. This requires that the inductance of the coil L be large in comparison in order to obtain a high circuit "Q" at both frequencies so that substantial linearity of deflection may be insured.

The schematic diagram of Fig. 7 illustrates another practical form embodying the invention. In this circuit, wherein $V_1$ and $V_2$ are gas tubes, the circuit resistance R has some finite value greater than zero but the "Q" of the resonant circuits is nevertheless reasonably high (i. e. Q greater than 10, for example). The power loss in the gas tubes, and the resistance R is compensated for by means of the battery $E_b$ and a step down transformer. The step-down transformer, indicated by reference character $T_1$, is variable and its tap position may be adjusted to equalize the charge and discharge currents (18 and 20 in Fig. 3) in capacitor $C_2$ to obtain a symmetrical deflection current wave. The transformer may further be provided, as shown, with an additional winding "H. V." for furnishing a source of high voltage which may be rectified and employed in the usual manner. Aside from the inclusion of the transformer $T_1$, the operation of the circuit is similar to that described for the circuit of Fig. 5.

Fig. 8 illustrates another practical embodiment of this invention in which the switch of the theoretical circuit of Fig. 4 is replaced by a symmetrical junction transistor. The bi-directional switching properties of such transistors are described in detail in the co-pending U. S. patent application of George C. Sziklai for "Electronic Switching," S. N. 308,618, filed September 9, 1952, now Patent No. 2,728,857, and assigned to the Radio Corporation of America, also the assignee of the present invention.

In general, the transistor of Fig. 8 may be of either the "n-p-n" or "p-n-p" variety, as explained in the above-identified application, but is illustrated here as a "p-n-p," symmetrical junction type. More particularly, it comprises an n-type region 40 interposed between two p-type regions 42 and 44, the interregion junctions being indicated by reference numerals 46 and 48. Ohmic, non-rectifying contacts with the regions 40, 42 and 44 are made, respectively, by base electrode 50, collector 52 and emitter 54. The collector electrode is connected to one end of the deflection coil L, while the other end of the coil is connected to one side of capacitor $C_2$, the other side of $C_2$ leads to the emitter electrode 54. Connected across $C_2$, just as in the circuit of Figs. 4 and 5, is a battery E which is adapted to charge $C_2$ through a large inductance choke $L'$.

As is explained fully by the detailed treatment given the bi-directional conductive properties of the symmetrical junction transistor in the cited Sziklai application, the desired switching of the present circuit may be effected in the following manner:

A voltage waveform of rectangular shape, as indicated at 56, is impressed upon the base electrode 50 in the polarity shown with respect to the D. C. level 58. Since a p-n-p type must be biased in a "forward" direction (i. e. with its base negative) in order to be conductive, the narrow, positive rectangular portion of duration $t_r$ renders the transistor non-conductive for the retrace period, thereby effectively opening the circuit and removing $C_2$ in parallel with $C_1$. At time $t_2$ (Fig. 3), the negative leading edge of voltage waveform 56 renders the transistor conductive, in which state it remains for the duration of the scanning period $t_s$. As shown in Fig. 3, and as above explained, the current waveform through the deflection coil L changes from a negative to a positive direction during the scanning time, and the current is moreover conducted in either direction by the transistor by reason of its symmetry and the fact its emitter and collector electrodes are able to reverse their function and become collector and emitter, respectively, as determined by the polarities existing at the emitter and collector electrodes.

From the foregoing portion of the specification, persons skilled in the art will appreciate the fact that the present invention provides a new and useful deflection circuit for wide deflection angle kinescopes wherein the deflection current during scanning time is actually a portion of a sine wave from a half cycle of such sine wave for a given tube contour and deflection angle to smaller portions of the sinusoidal form for lower deflection angles. Similarly, the retrace portion of the deflection coil current is a section of a sine wave of higher frequency so that both currents are produced by one or both of two capacitances in conjunction with the inductance of the deflection coil, while the other capacitance is switched into the circuit in parallel with the first capacitance to produce the lower scanning frequency.

A further fact to be borne in mind is that, while the invention has been illustrated by an electromagnetic deflection system, the basic principle of employing a section of a sinusoidal wave as the deflection energy during scansion and a section of a higher frequency sine wave during retrace may be applied to other types of deflection means, such as electrostatic deflection.

Having thus described my invention, what I claim as new and desire to secure by Letters Patent is:

1. A deflection circuit for a cathode ray tube which is adapted to cause a cathode ray beam tip to traverse the face of said tube at a predetermined rate, said tube face having a relatively large radius of curvature such that said rate results in a constant velocity of the beam tip projection onto a plane tangent to the tube face center which comprises: means for subjecting a cathode ray beam to an electrical force adapted to cause movement of such beam; means for generating a sinusoidal wave form, said waveform being of such frequency that a selected portion of not more than one-half cycle thereof is adapted to cause travel of the beam tip projection across a plane tangent to said tube face at a substantially linear rate; means for generating a second sinusoidal wave form of higher frequency than said first-named sinusoidal wave such that a portion of the cycle of said high frequency waveform causes such beam to travel across said tube face in the direction opposite to its first-named movement and at a higher rate; and switch means for alternately applying said first and second sinusoidal waveforms to said first-named means.

2. A cathode ray beam deflecting circuit which comprises an electromagnetic deflection coil and means including a capacitance forming a first resonant circuit for passing through said coil a sinusoidal current wave for energizing said coil in such manner as to produce scanning movement of said beam transversely of a plane at a predetermined linear rate; means for coacting with said coil to form a second resonant circuit having a higher frequency than said first-named resonant circuit such that a portion of sinusoidal current wave produced by said second resonant circuit returns said beam at a linear rate greater than said scanning movement; and switch means for alternating between said first and last-named means.

3. A circuit adapted to cause deflection of a cathode ray beam in two generally parallel directions which comprises: an electromagnetic deflection coil; a first capacitance in parallel with said coil adapted to form therewith a circuit resonant at such frequency that the current in said coil during movement of said beam in one direction comprises a selected portion of a sinusoidal waveform; a second capacitance; electronic switch means for intermittently connecting said second capacitance in circuit with said first capacitance, whereby to form a resonant circuit of lower frequency.

4. A cathode ray beam deflecting circuit as defined by claim 3 wherein said electronic switch means comprises two electronic tubes connected in parallel and in opposition, whereby one of said tubes is adapted to conduct during positive portions of the lower of said frequencies and the other of said electronic tubes is adapted to conduct during negative portions of the wave of said low frequency.

5. A deflecting circuit adapted to cause alternate scanning movement and retrace of a cathode ray beam through a wide angle which comprises: an electromagnetic deflection coil; capacitance in parallel with said coil adapted to form a resonant circuit having a frequency of oscillation such that a portion of one sinusoidal cycle of current in said coil is proportional to the sine of the angle of deflection of such beam during scanning movement, whereby to cause uniform movement of said beam tip's projection; means for effectively removing a part of said capacitance from the circuit of said coil at the end of such scansion.

6. A deflecting circuit adapted to cause scanning movement of an electron beam in a cathode ray tube through an angle which comprises: an electromagnetic deflection coil; capacitance in parallel with said coil to form a resonant circuit of such frequency that a selected portion $\theta$ of one sinusoidal cycle of current in said coil is adapted to cause uniform velocity travel of said beam tip's projection, said tube having a screen contour approximately defined by the relations $r/r_0 = \theta/\sin\theta$, and $$K/K_{max} = \theta/\theta_{max}$$

as related by the parameter $J = K_{max}/\theta_{max}$, where $r_0$ is the radius of deflection at the screen center, $r$ is the radius for deflected beam positions, $K_{max}$ is the maximum distance traversed by said beam's projection from the tube center to one extreme position, and $K$ is an intermediate deflected distance of such beam projection; and means for effectively decreasing said capacitance at the end of each of said selected sinusoidal current sections thereby to increase the frequency of said resonant circuit for causing relatively rapid retrace of said beam.

7. In combination, a cathode ray tube having a screen contour approximately defined by the relations $$r/r_0 = \theta/\sin\theta \text{ and } K/K_{max} = \theta/\theta_{max}$$

as related by the parameter $J = K_{max}/\theta_{max}$, where $r_0$ is the radius of deflection of an electron beam in said tube at the screen center, $r$ is the radius for deflected beam positions, $K_{max}$ is the maximum distance traversed by said beam's projection from the tube center to one extreme position, $K$ is an intermediate deflected distance of such beam projection; and a deflecting circuit adapted to cause scanning movement of said electron beam through an angle, said deflecting circuit comprising an electromagnetic deflection coil; capacitance in parallel with said coil adapted to form a resonant circuit of such frequency that a selected portion $\theta$ of one sinusoidal cycle of current in said coil causes uniform velocity travel of said beam tip's projection; means associated with said coil for energizing said coil with a sinusoidal current wave of higher frequency than said first-named frequency to return such beam through said angle at a higher velocity than said uniform velocity, and switch means for periodically alternating between said first and second named frequencies.

8. The combination as defined by claim 7 wherein the value of $\theta_{max}$ is equal to $$\frac{\pi}{2}$$

9. A deflecting circuit adapted to cause scanning movement of an electron beam in a cathode ray tube through a deflection angle $\alpha$ which comprises: an electromagnetic deflection coil; capacitance in parallel with said coil to form a circuit resonant at a certain frequency, said tube having a screen contour approximately defined by the relations $r/r_0 = \theta/\sin\theta$, and $K/K_{max} = \theta/\theta_{max}$, where $r_0$ is the distance from said beam's center of deflection to the center of said screen, $r$ is the distance from said center of deflection to said screen for a deflected position of said beam, $K_{max}$ is the distance from said tube screen center to a line located at the extremity of said screen in the plane of deflection and parallel to the axis of said beam in its central position; means for passing through said coil a section of a sinusoidal current wave of said resonant frequency, such that a section $\theta$ of a sinusoidal current wave of said resonant frequency in said coil causes uniform velocity of travel of the projection of said beam's tip through said angle $\alpha$, said section $\theta$ being defined by the equation $\theta = K/J$, where $J$ is a parameter equal to $K_{max}/\theta_{max}$; means associated with said coil to energize said coil with a sinusoidal current wave of higher frequency than said first-named frequency to return such beam through said angle at a higher velocity than said uniform velocity, and switch means for periodically alternating between said first and second named frequencies.

10. A cathode ray tube beam deflecting circuit which comprises: deflecting means for subjecting a cathode ray beam to a deflecting force; resonant circuit means for generating a sinusoidal current waveform of such frequency that a selected portion of not more than one-half cycle thereof is adapted to cause lateral scanning movement of the perpendicular projection of said beam's tip at a substantially linear rate with respect to a reference surface at the screen of such tube; means for generating a second sinusoidal waveform having a frequency higher than said first-named sinusoid, such that a portion of said second waveform cause retrace of said beam at a correspondingly higher rate than said scanning travel; and switch means for alternately applying said first and second sinusoidal waveforms to said deflecting means.

References Cited in the file of this patent

UNITED STATES PATENTS

| Re. 21,400 | Blumlein | Mar. 19, 1940 |
| 2,149,077 | Vance | Feb. 28, 1939 |
| 2,302,161 | Woerner | Nov. 17, 1942 |
| 2,498,007 | Schade | Feb. 21, 1950 |
| 2,543,428 | Wendt et al. | Feb. 27, 1951 |
| 2,571,824 | Boyd et al. | Oct. 16, 1951 |
| 2,595,228 | Crist | May 6, 1952 |